UNITED STATES PATENT OFFICE.

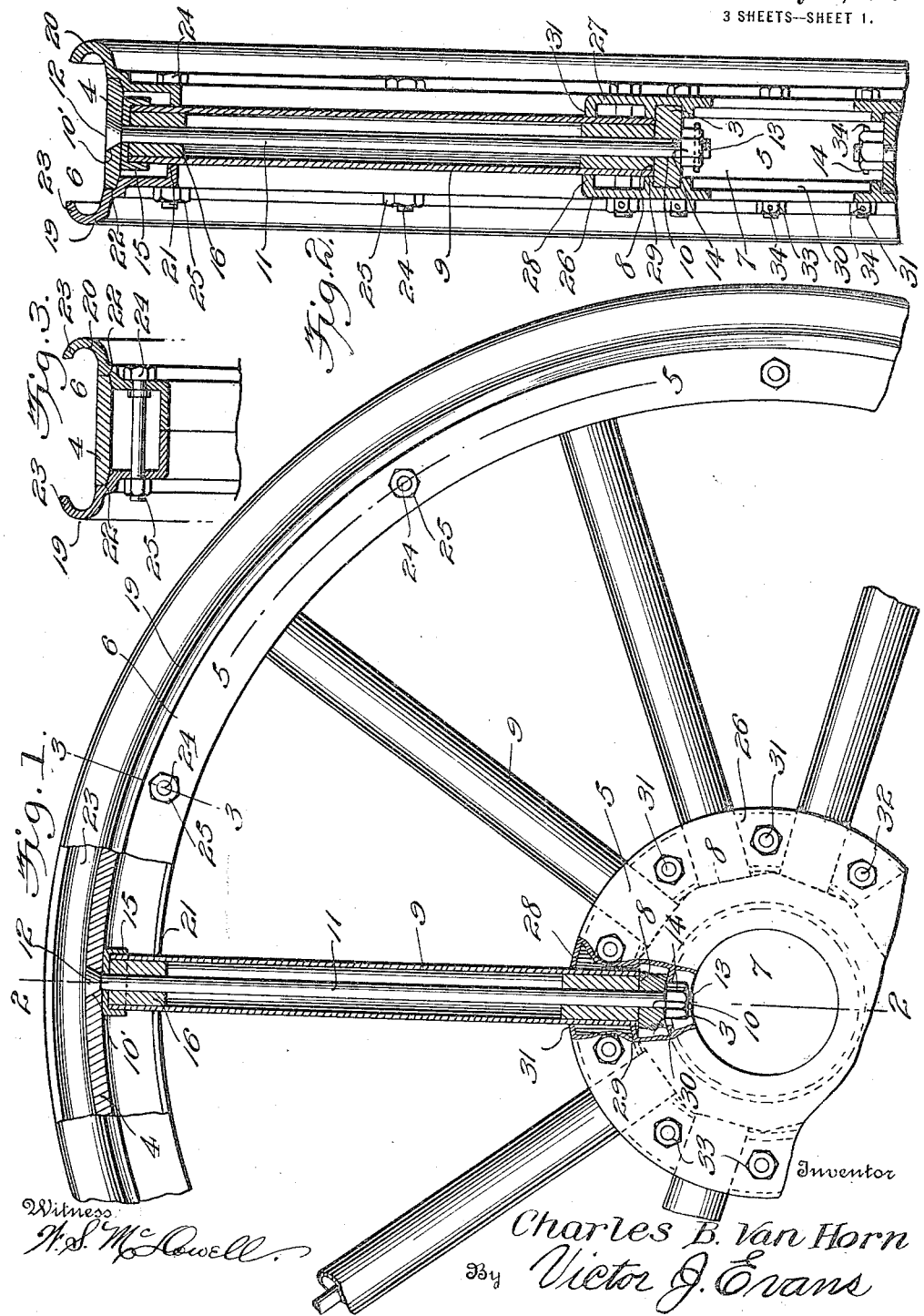

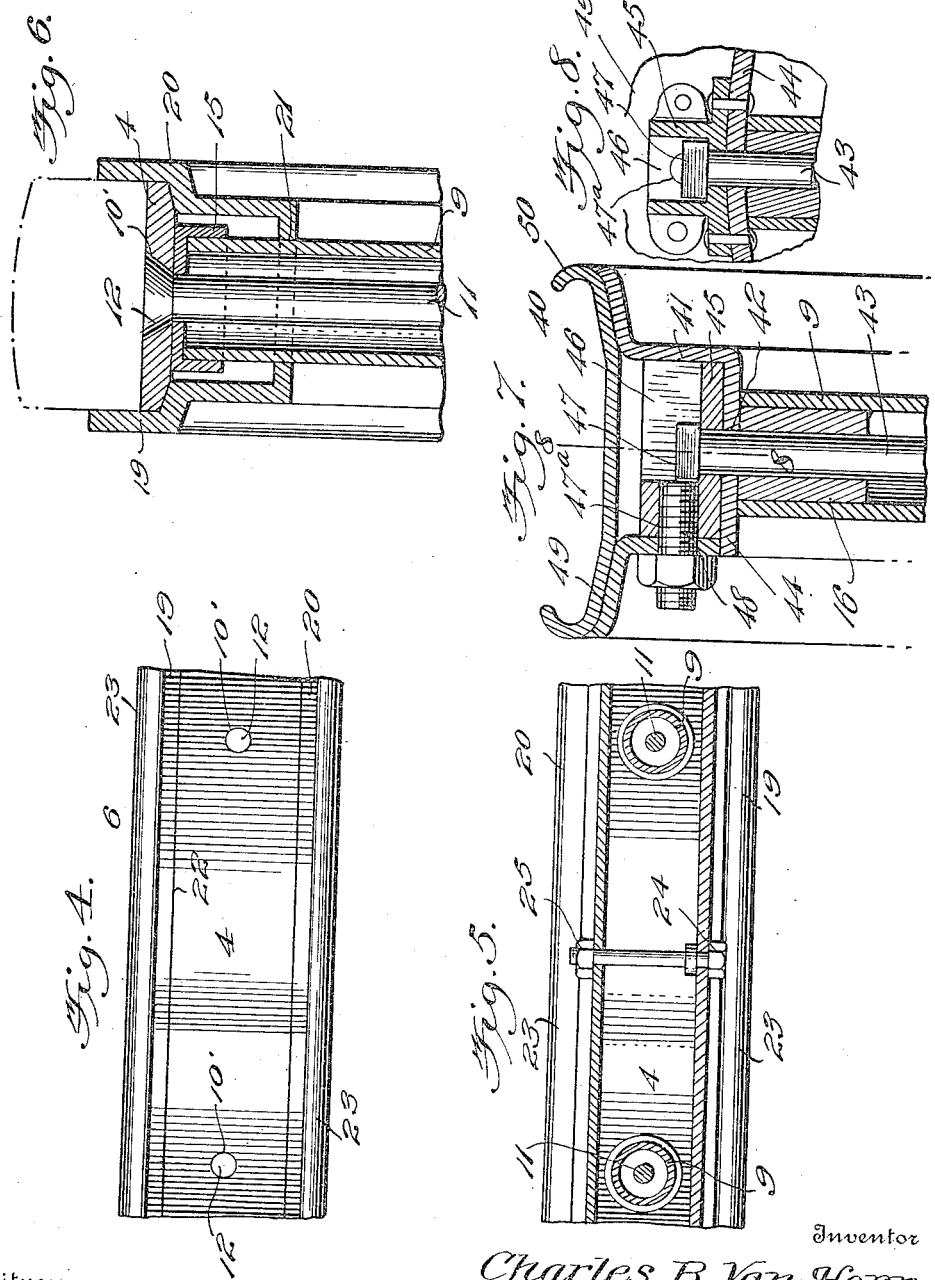

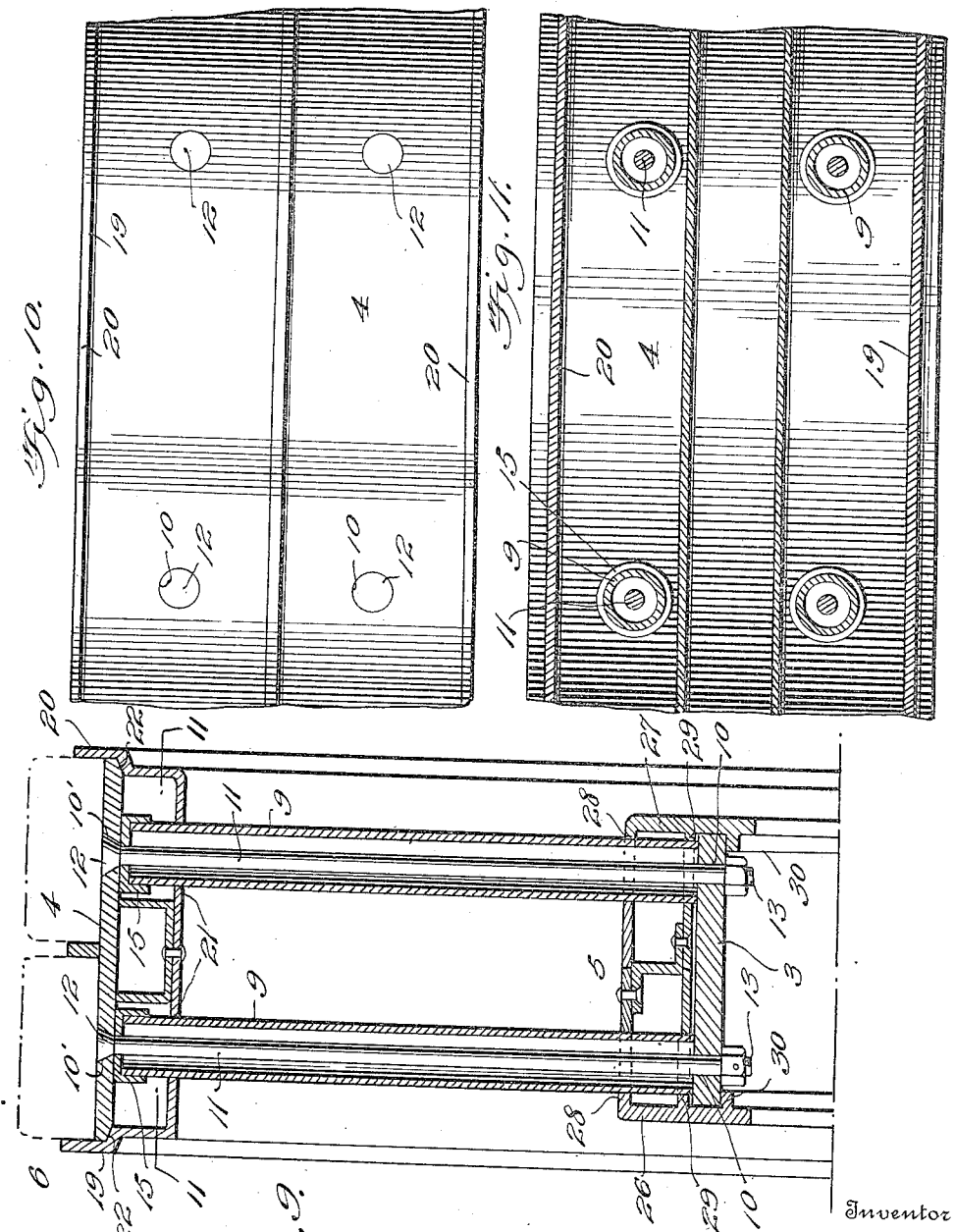

CHARLES B. VAN HORN, OF PHILADELPHIA, PENNSYLVANIA.

VEHICLE-WHEEL.

1,226,421.
Specification of Letters Patent.
Patented May 15, 1917.

Application filed May 19, 1916. Serial No. 98,583.

*To all whom it may concern:*

Be it known that I, CHARLES B. VAN HORN, a citizen of the United States, residing at Philadelphia, in the county of Philadelphia and State of Pennsylvania, have invented new and useful Improvements in Vehicle-Wheels, of which the following is a specification.

The invention relates to wheels for vehicles, particularly of the type used on automobiles and has for an object to provide a vehicle wheel which will permit of readily associating or disassociating a pneumatic or other form of tire therewith, and which will present a unitary structure involving strength, durability and ease of manipulation.

Still further the invention comprehends a wheel of the above character, wherein the various salient members comprising the same are formed entirely of metal.

Another object is to provide a metallic vehicle wheel characterized by its substantial and durable features of construction; by the general accessibility of the various parts thereof; the convenient and simple manner of assembling said parts and for readily removing certain portions thereof, so that the wheel may be readily repaired or that the parts may be adjusted.

Further objects reside in a vehicle wheel of the above type which will be economical to manufacture and perfectly reliable in operation.

Still further objects rest in a metallic wheel having an integral clamp and felly portion, which allows a tire to be conveniently placed and clamped in position upon the wheel or to be readily removed therefrom.

Other objects will be in part obvious and in part pointed out hereinafter.

The invention consists in the features of construction, combination of elements and arrangement of parts, herein described, illustrated and claimed.

In the accompanying drawings, wherein is shown several of the various possible embodiments of the invention, Figure 1 is an elevation of a wheel comprising the present invention, parts having been broken away to disclose the underlying structure, Fig. 2 is a vertical transverse sectional view taken on the line 2—2 of Fig. 1, Fig. 3 is a similar view taken on the line 3—3 of Fig. 1, Fig. 4 is a fragmentary top plan view of the wheel, Fig. 5 is a sectional view taken along the line 5—5 of Fig. 1, Fig. 6 is a fragmentary vertical transverse sectional view, disclosing a method of associating a solid rubber tire to the wheel, Fig. 7 is a similar view illustrating a slightly modified form of construction of connecting a tire rim to the wheel, Fig. 8 is a detail sectional view on the line 8—8 of Fig. 7, Fig. 9 is a vertical transverse sectional view disclosing a further modified form of the invention as when employed in a construction of a motor truck wheel, Fig. 10 is a fragmentary top plan view of the construction disclosed in Fig. 9, and Fig. 11 is a sectional view taken on the line 11—11 of Fig. 9.

Referring more particularly to Figs. 1 to 5 of the drawings, one of the fundamental and principal features of the present invention consists in the spoke mechanism and in the coöperating internal and external tension and compression supporting rings 3 and 4, around which are formed hub and rim constructions 5 and 6, respectively. The internal ring 3 is provided with a central opening 7, and, on its outer surface, with beveled faces 8, upon which are positioned the inner extremities of hollow, metallic spokes 9, situated between the internal ring 3 and the external ring 4. Passing centrally through the spokes 9, and through alining openings 10 and 10' formed in the rings 3 and 4 respectively, are connecting bolts 11 which are provided with enlarged heads 12 located within the similarly shaped openings 10' of the ring 4. The inner extremities of the bolts 11 pass entirely through the openings 10 of the internal ring 3 and are formed with threaded extremities 13, having binding nuts 14 threaded thereon, the latter being positioned within the opening 7 of the ring 3 and bearing against the wall of said opening. Wear receiving caps 15 are interposed between the outer ends of the spokes 9 and the external ring 4, said caps primarily serving as bearings or washers to strengthen the outer extremities of said spokes, and to provide a broad bearing surface for the same at their point of engagement with the ring 4. The interior of the spokes 9 may be filled with a suitable insert or sleeve of any suitable material, as indicated at 16. From the foregoing description it will be seen that the first step in assembling the wheel, is to unite the ring 4 with the internal ring 3 which is accomplished by the bolts 11 and the spacing members or spokes 9. By tightening the clamping nuts 14 the structure will be in a position to receive the other rim and hub members to be described respectively. As disclosed by the drawings the rim construction may be formed in various ways, however, the preferred form of rim construction has been disclosed in Figs. 1 to 5. This construction consists essentially of a combination felly and tire retaining rim, which comprises annular side pieces 19, 20, each consisting of an integral clamp and felly portion, formed with alining openings 21 for the reception of the spokes 9. The side pieces 19 and 20 are provided with annular recesses 22 which receive the outer edges of the external supporting ring 4, and said side pieces 19 and 20 are further provided with tire engaging flanges 23, designed to engage a tire (not shown) so that the latter will be supported upon the wheel. The side pieces 19 and 20 are preferably formed separate in order that the tire may be readily secured to the rim construction 17 or removed therefrom in the event of an accident occurring to the same. Bolts 24 extend transversely through the plates so that the latter will be retained in a locked coöperative position. If for any reason the tire has to be removed, the binding nuts 25 can be removed from the bolts 24 so that the sidepiece 19 may be removed from engagement with the ring 4, thus permitting the tire to be readily removed from said rim construction.

The hub 18 consists of opposed plates 26 and 27 which are provided with spaced integral circular flanges 28, 29 and 30. The flanges 28 and 29 are formed with circular recesses 31 which permit the plates 26 and 27 to surround the spokes 9 and the interal ring 3 is maintained in a fixed position by being situated between the flanges 29 and 30. Transversely extending bolts 31 extend through the plates 26 and 27 and are provided with threaded extremities 32 for the reception of binding nuts 33, by which said plates are retained in a secured position around said spokes and ring 3. The hub 18 may be of any suitable construction as may be deemed advisable in the manufacture of the wheel and thus the same may be provided with means (not shown) to receive a driven axle, or with means to receive a stationary axle, as the wheel may be used with equal facility upon a rotating shaft or upon an idle one, as will be clearly understood. It will be noted that the spokes 9 have their inner extremities in engagement with the flanges 28 and 29 which permits the spoke to be gripped or secured in a positive manner by the flanges so that there will be no tendency on the part of the spokes to bend or strain when power is imparted to the flanges. The binding nuts 14 and 33 are preferably provided with suitable locking means 34 to prevent the same from becoming loosened or disengaged from the coöperating bolt members when the wheel is in operation. It will be seen that there is provided a wheel of strong durable construction, designed to be capable of withstanding all manner of shock and jar to which the wheel will be necessarily subjected, the parts thereof being compactly and strongly formed so that the wheel will be capable of withstanding severe use and shocks without weakening. In operation, after the rims 3 and 4 have been connected by the spoke members 9, the rim and hub construction 17 and 18 may be readily applied thereto in a simple and convenient manner without requiring the services of a skilled mechanic.

In Fig. 6 the construction of the wheel is identical in every respect to the wheel disclosed in the preferred form, with the exception of forming the tire engaging portions of the side pieces 19 and 20 straight instead of curved. This is done in order that the rim 4 may accommodate the usual form of solid rubber tires in common use upon certain classes of vehicle wheels. In Fig. 7 a still further modification is disclosed but the same is similar in principle to the construction disclosed by the preferred form. In this instance the spokes 9 of the wheel 40 have their outer extremities in engagement with an angular annular side piece 41 having openings 42 formed therein to receive the outer extremities of bolt members 43. Secured to the rim 44 of the side piece 41 is a casting 45 provided with a socket 46 to receive the enlarged head portions 47 of the bolts 43. The casting 45 is further provided with threaded openings 47ª for the reception of bolts 48 which extend through plates 49 coöperating with the side piece 41 to support and secure in locked position an annular tire holding ring 50. This construction is employed for connecting a tire having a demountable rim associated therewith, to the wheel 40 in a simple and convenient manner. In Figs. 9 to 11 the wheel disclosed therein consists merely in duplicating the construction disclosed in the preferred form. This construction is chiefly employed upon motor trucks and similar heavy vehicles.

Having described my invention, I claim:

1. A wheel comprising, in combination, a hub and a rim, embodying internal and external rings, spacing spokes situated between said rings, retaining bolts passing through said rings and spokes whereby said members are maintained in an assembled position, opposed felly plates provided with recesses for receiving said spokes, and fastening means extending through said felly plates to secure the same in position upon said external ring and around said spokes.

2. A wheel comprising, in combination, a hub and a rim, embodying internal and external rings, spacing spokes situated between said rings, means for rigidly securing said rings and associated spokes, opposed annular felly plates clamped to said external rings and provided with alining recesses to receive said spokes, and tire retaining rims integrally formed with said felly plates.

3. A wheel comprising, in combination, a hub and a rim, said hub and rim embodying internal and external rings, spacing sleeves confined between said internal and external rings, bolts passing through said rings and through said sleeves, means associated with the inner extremities of said bolts for rigidly retaining said rings and sleeves in an assembled position, opposed annular felly plates provided with annular recesses to receive said external ring and with alining recesses to receive said sleeves, and means extending horizontally through said felly plates to clamp the same in position about said ring and sleeves.

4. A wheel comprising, in combination, a hub and a rim, said hub and rim embodying internal and external rings, spacing sleeves confined between said internal and external rings, bolts passing through said rings and through said sleeves, clamping means associated with the inner extremities of said bolts, opposed annular felly plates provided with annular recesses to receive said external ring and with alining recesses to permit said felly plates to embrace said sleeves, fastening bolts passing transversely through said felly plates to retain the same in a clamped position relative to said external ring and the outer extremities of said sleeves, and tire securing rims integrally formed with said felly plates.

5. A wheel comprising, in combination, a hub and a rim, said hub and rim embodying internal and external rings, spokes situated between said internal and external rings, means passing through said spokes for rigidly retaining said rings and spokes in an assembled position, opposed annular felly plates embracing said external ring and provided with alining recesses to receive the outer extremities of said spokes, fastening bolts passing transversely through said felly plates, integral tire securing rims formed with said felly plates, and means admitting of the removal of one of said felly plates whereby said tire may be removed from said wheel.

In testimony whereof I affix my signature in presence of a witness.

CHARLES B. VAN HORN.

Witness:
AMY B. HORN.

Copies of this patent may be obtained for five cents each, by addressing the "Commissioner of Patents, Washington, D. C."